(No Model.)
R. DEAN.
APPARATUS FOR THE DISTILLATION OF HYDROCARBONS.
No. 314,368. Patented Mar. 24, 1885.
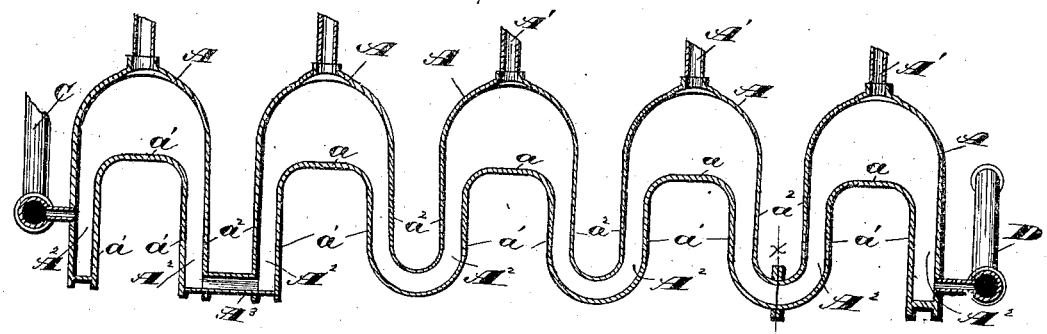
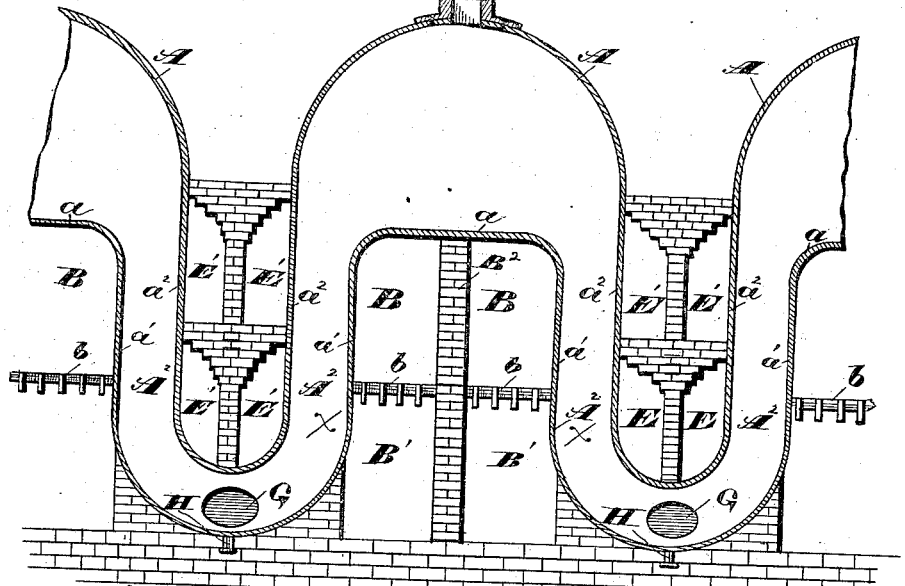
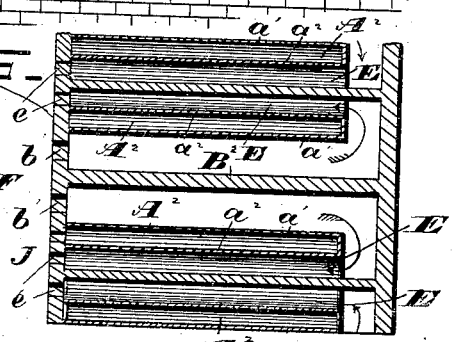
WITNESSES
INVENTOR
Richard Dean
by
Leggett & Leggett
Attorneys

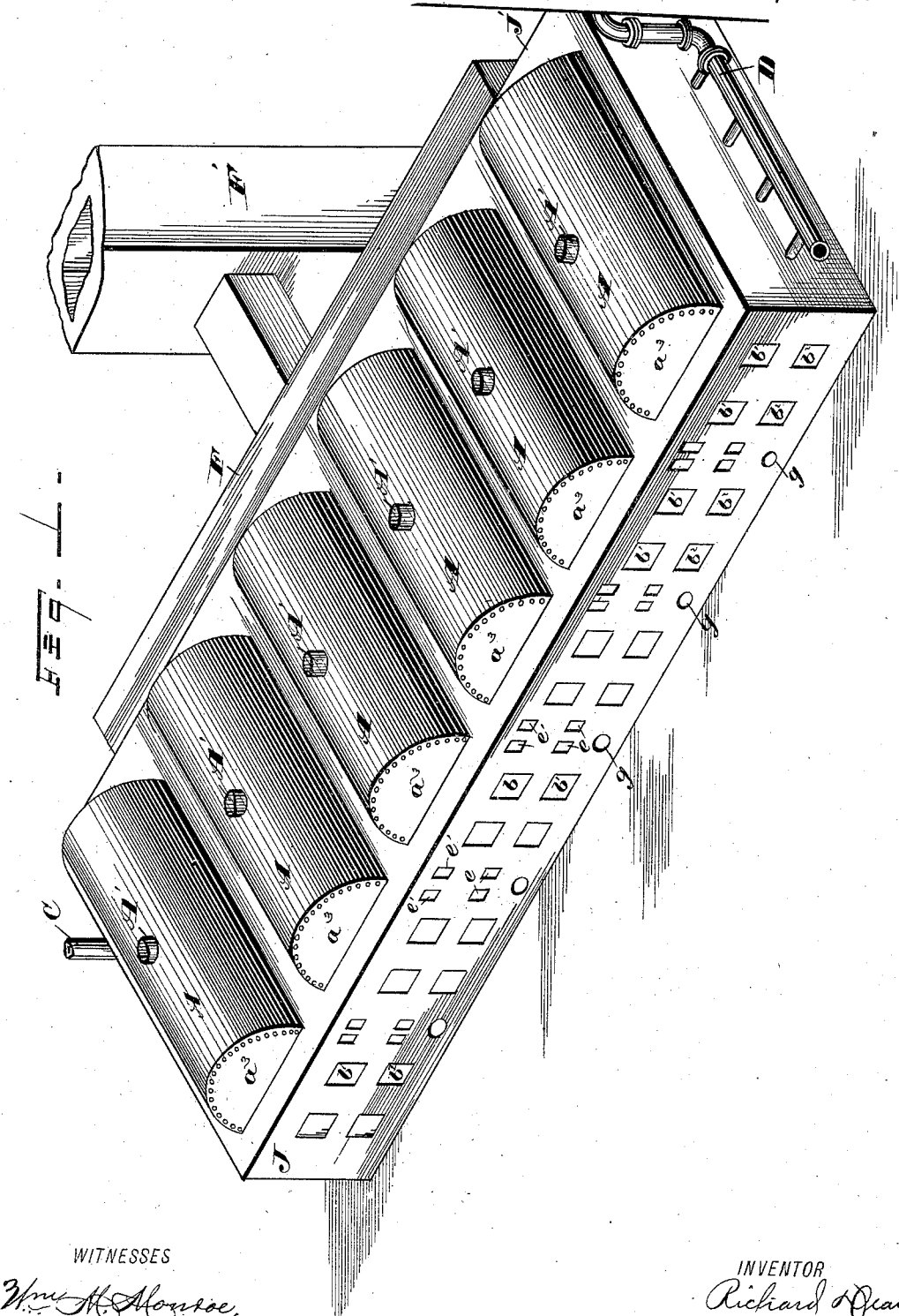

UNITED STATES PATENT OFFICE.

RICHARD DEAN, OF CLEVELAND, OHIO, ASSIGNOR OF ONE-HALF TO JAMES QUARRIE, OF SAME PLACE.

APPARATUS FOR THE DISTILLATION OF HYDROCARBONS.

SPECIFICATION forming part of Letters Patent No. 314,368, dated March 24, 1885.

Application filed January 30, 1885. (No model.)

*To all whom it may concern:*

Be it known that I, RICHARD DEAN, of Cleveland, in the county of Cuyahoga and State of Ohio, have invented certain new and useful Improvements in Apparatus for the Distillation of Hydrocarbon; and I do hereby declare the following to be a full, clear, and exact description of the invention, such as will enable others skilled in the art to which it pertains to make and use the same.

My invention relates to improvements in apparatus for the distillation of hydrocarbon oils, having for its object a series of stills, each provided with a fire-box and a crown-sheet, and the successive stills in open relation with each other at the bottom, forming a continuous system, and feed and discharge pipes, so arranged that a constant flow of oil is had through the stills, and the oil is kept at a uniform depth above the crown-sheets, to the end that in passing over the crown-sheets of the respective stills the oil is uniformly under the same conditions for distillation, and with an even heat applied will distill the same product lighter or heavier, according to the degree of heat maintained in the respective stills.

With these objects in view my invention consists in certain features of construction and in combination of parts hereinafter described, and pointed out in the claims.

In the distillation of hydrocarbon oil, it is generally understood that lighter or heavier products are distilled according to the degree of heat applied in the distillation. In practice, however, it is found that to obtain the desired result with certainty and accuracy the oil must all be treated under the same conditions during the distillation; for instance, when a large body of oil is being treated in bulk, the degree of heat required to distill a given light product will be less when the distillation takes place near the surface than when the light product must come from a considerable distance below the surface. On the other hand, the heat required for distilling the light product from a considerable depth below the surface will distill a heavier product at or near the surface. Under such treatment the product will be a mixture of lighter and heavier distillates, the aggregate of which may approximate the desired product; but a variety of products ranging between the lighter and heavier distillates thus united might have been obtained as separate products, had suitable means been employed. When the oil is treated in bulk, as aforesaid, in distilling the heavier products, during the latter stage of the process, so high a degree of heat is required to distill all of such products from the depth of the mass that the residuum is frequently scorched and discolored, so that the valuable products—such as lubricating-oils, &c.—that are obtained from the residuum or tar by a subsequent process require bleaching, which would not be the case if only such a degree of heat were employed as would distill such heavy products at or near the surface. I have therefore devised a series of stills connected at the bottom, forming a continuous system, with the supply and discharge pipe arranged so that a constant flow of oil is had through the stills, and by means of the elevation in a portion of the discharge-pipe the oil is kept at a uniform depth, respectively, in each still, and with a separate fire-box for each still, and a crown-sheet in each, over which the oil to be distilled passes in a thin sheet and with a uniform velocity, by means of which a given product may be obtained, respectively, for each still, the distillates being of course lighter or heavier, according to the heat applied.

In the accompanying drawings, Figure 1 is a view in perspective of a plant of stills embodying my invention. Fig. 2 is a section in elevation taken longitudinally through the plant. Fig. 3 is an enlarged elevation in section of a portion of the plant, showing the setting. Fig. 4 is a side elevation of a still with the setting in section, showing the arrangement of the flues. Fig. 5 is a horizontal section on the line of *x x*, Fig. 3, showing a plan of the flues.

A represents stills that may be of any desired number or size and are arranged in a plant, as shown. Each still is provided on top with one or more pipes, A', for the discharge of the distillates. These pipes lead to condensers (not shown) of any suitable construction; but each still may have a separate condenser, if preferred; but the different pipes A' are arranged so that the distillates from the respective stills may be kept separate. The form of the stills is shown in Figs. 2 and 3. The crown-sheet $a$ joins or is integral with the sheets $a'$, and the latter, with the outer sheets, $a^2$, inclose the chambers $A^2$, similar to the water-legs on a locomotive-boiler at the sides of the fire-box. The crown-sheet and sheets $a'$ extend to the front and rear heads, $a^3$, of the still, and consequently the chambers $A^2$ are of corresponding length. Each still is provided with one or more fire-boxes, B, with grates $b$, and ash-pits B', with corresponding doors, $b'$ and $b^2$. As these stills are usually large, the distance between the legs being perhaps eight feet, more or less, a division-wall, $B^2$, is usually provided to divide the space, although this is not essential. With such divisions, however, one portion of the fire can be cleaned without disturbing the other portion, and, if desired—for instance, in distilling light products—the one fire might be banked or removed from one fire-box under a still. The next adjacent chambers $A^2$ are in open relation with each other. A supply-pipe, C, is arranged at one end of the plant, and a discharge-pipe, D, at the opposite end. These pipes may lead directly to the respective outside chambers $A^2$, or may be connected with smaller pipes, as shown at the right hand in Fig. 1, the latter arrangement being preferable, as with such branch pipes the current of oil passing over the crown-sheet of the outer stills is likely to be more uniform. The discharge-pipe D should communicate with the chamber $A^2$ as near to the bottom of the latter as is practicable; but outside of the setting the pipe D is extended upward far enough to raise the liquid in the still so as to cover the crown-sheets to the depth of perhaps three or four inches, more or less. The heat from the respective furnaces B is returned through, respectively, the next adjacent flues E, and from thence near the front of the plant passes up into the flues E', from whence it is conducted in any suitable manner—for instance, by the smoke-box F—to one or more chimneys, F'. In the front setting, J, and, if necessary, in the back setting, J', also, are doors $e$, leading to the flues E, and doors $e'$, leading to the flues E', by means of which these flues are easily cleaned; also, doors $g$ are located in front of the hand-holes G, so that these latter are accessible. The hand-holes may be located wherever they are most convenient, but should be as near the bottom of the legs as is practicable. The legs of the adjacent stills are shown as integral; but this would be hardly practicable or desirable. They may be divided, for instance, on the line $x\,x$, (see Fig. 2,) and flanges provided, as there shown, for securing the parts; or these legs might be constructed as shown at the left hand in Fig. 2, and connected with tubes $A^3$. The only essential feature in this part of the construction is to provide a free circulation from one still to the other, through or near the bottom of these legs. Drain-pipes H are provided and located so that each chamber $A^2$ may be drained, if necessary, as would be the case if repairs were necessary.

In operating the stills, the ingress of oil is controlled by a valve (not shown) in the supply-pipe C, and is allowed to fill the stills as far as the discharge-pipe D will admit before the fires are started, after which a continuous supply of oil is admitted that flows in sheets of uniform depth and velocity over the respective crown-sheets. By reason of the flues E and E', contiguous to the legs of each still, more or less heat is imparted to the oil in passing through these legs; but the distillation is had as the oil passes over the crown-sheets, where the heat is the greatest; but all of the oil as it passes a given crown-sheet is subject to the same condition, and if a uniform heat is maintained under such crown-sheet a uniform distillate will be had. A low fire is kept in the furnace of the still next to the supply-pipe, and a light product is distilled. A slight increase in the fires of the next still will slightly increase the gravity of the distillate from this still, and so on through the series. If only the lighter products are to be kept separate, the medium and heavier products may be united by connecting such of the pipes A' as is necessary; or such products may be mixed after condensation.

By reason of the construction and operation of the still as aforesaid, the heavier products are distilled with so low a degree of heat that the residuum is not scorched, and the products of the residuum, lubricating-oils, &c., do not require bleaching.

Steam or other vapors or gases may be utilized in the condensing process the same as with other forms of stills, and the product of each still may be subdivided indifferentially; but my present invention only pertains to the stills.

What I claim is—

1. A still for distilling hydrocarbon oils, and provided with a crown-sheet, and inner and outer plates extending below the body of the still, forming hollow so-called legs that extend the length of the still, and one or more fire-boxes located between the legs and under the crown-sheet, one or more feed-pipes leading into the leg on one side, and a discharge-pipe connected with the opposite leg, and the parts so arranged that a continuous flow of oil is had through the still and maintained at a uniform depth by the elevation of the discharge-pipe, substantially as set forth.

2. For the fractional distillation of hydrocarbon oils, a series of stills, each provided with a crown-sheet and hollow so-called legs extending the length of the still, and inclosing a fire-box between the legs and the next adjacent legs of the stills, connected at the bottom, forming a connected system from end to end of the plant, a feed-pipe and a discharge-pipe at the opposite end of the system, and the parts so arranged that a continuous flow of oil may be had through the stills and maintained at a uniform depth by the elevation of the discharge-pipe, substantially as set forth.

In testimony whereof I sign this specification, in the presence of two witnesses, this 12th day of January, 1885.

RICHARD DEAN.

Witnesses:
 CHAS. H. DORER,
 ALBERT E. LYNCH.